United States Patent
Nelles et al.

(10) Patent No.: US 7,351,371 B2
(45) Date of Patent: Apr. 1, 2008

(54) METHOD FOR THE PRODUCTION OF NEAR NET-SHAPED METALLIC AND/OR CERAMIC PARTS

(75) Inventors: Heinz Nelles, Cagayan de Oro (PH); Martin Bram, Jülich (DE); Hans Peter Buchkremer, Heinsberg (DE); Detlev Stöver, Niederzier (DE)

(73) Assignee: Forschungszentrum Julich GmbH, Julich (DE)

( * ) Notice: Subject to any disclaimer, the term of this patent is extended or adjusted under 35 U.S.C. 154(b) by 4 days.

(21) Appl. No.: 10/531,887

(22) PCT Filed: Sep. 19, 2003

(86) PCT No.: PCT/DE03/03113

§ 371 (c)(1),
(2), (4) Date: Apr. 25, 2006

(87) PCT Pub. No.: WO2004/039748

PCT Pub. Date: May 13, 2004

(65) Prior Publication Data

US 2006/0239851 A1    Oct. 26, 2006

(30) Foreign Application Priority Data

Oct. 18, 2002  (DE) ................................ 102 48 888

(51) Int. Cl.
*B22F 3/11*  (2006.01)
(52) U.S. Cl. ................... 419/2; 419/36; 419/37
(58) Field of Classification Search ............ 419/2, 419/36, 37
See application file for complete search history.

(56) References Cited

U.S. PATENT DOCUMENTS

| | | | | |
|---|---|---|---|---|
| 4,996,022 A * | 2/1991 | Shindo et al. | ................ | 419/2 |
| 5,028,367 A * | 7/1991 | Wei et al. | .................... | 264/656 |
| 5,051,182 A * | 9/1991 | Wang et al. | ........... | 210/500.27 |
| 5,059,388 A | 10/1991 | Kihara et al. | | |
| 5,369,063 A * | 11/1994 | Gee et al. | ..................... | 501/82 |
| 5,613,183 A | 3/1997 | Wiech | | |
| 6,759,004 B1 * | 7/2004 | Dwivedi | ........................ | 419/2 |
| 2002/0098105 A1 * | 7/2002 | Kadavy et al. | ............... | 419/28 |

FOREIGN PATENT DOCUMENTS

| | | |
|---|---|---|
| DE | 196 38 927 | 3/1998 |
| EP | 0 362 866 | 4/1990 |
| JP | 59 83972 | 5/1984 |

OTHER PUBLICATIONS

"Production of Porous Ceramics", Koyama Shiro;Pub.#04240167-08-27-92 (1 page).
"European Search Report", EP 89 11 8587.

\* cited by examiner

*Primary Examiner*—Roy King
*Assistant Examiner*—Ngoclan T. Mai
(74) *Attorney, Agent, or Firm*—Andrew Wilford

(57) ABSTRACT

A porous near-net-shape metallic parts with an open porosity of at least 10% by volume is made by first forming an injectable mass of a metallic powder of stainless steel, Ti, NiTi, or a titanium alloy, at least one thermoplastic binder, and at least one place holder. The mass then injection molded into the shape of the part to be produced, cooled, set in a capillary-active material, and subjected to a first-stage binder removal to produce an open porosity. The place holder is then removed at least partially from the part with a fluid, and the part is subjected to a thermal binder-removing process. Finally the part is sintered.

12 Claims, No Drawings

METHOD FOR THE PRODUCTION OF NEAR NET-SHAPED METALLIC AND/OR CERAMIC PARTS

CROSS REFERENCE TO RELATED APPLICATIONS

This application is the US national phase of PCT application PCT/DE2003/003113, filed 19 Sep. 2003, published 13 May 2004 as WO 2004/039748, and claiming the priority of German patent application 10248888.6 itself filed 18 Oct. 2002.

FIELD OF THE INVENTION

The inventions relates to a method of making parts, in particular parts of metallic and/or ceramic powder of near-net shape using the process of powder injection molding (PIM).

BACKGROUND OF THE INVENTION

A) A Method of Producing Metallic Parts of Near-Finish Shape.

Metal powder injection molding (MIM) is a method of the mass production of metallic parts, in particular for the production of such parts of near net shape (NNS). The MIM process makes it possible to automatically and inexpensively produce small to medium-large parts in large quantities. The MIM method produces parts with a density equal to 95 to 98% of the theoretical density that can be produced by subsequent hot isostatic compression of the part (without encapsulation).

The method entails the plastification of metal powders with spherical or irregular morphology (particle size from 5 to 300 μm) with a binder system to a so-called feedstock. The goal of the preparation is the coating of all the particles with the organic binder. The feedstock is homogenized in a mixer. Then the feedstock is charged into the injection-molding machine. In a heated zone components of the binder system (e.g. specific waxes) are melted. A worm advances the thermoplastic mass into the separable mold. After the mold is filled, the liquid mass hardens so the parts can be demolded. The binder system is separated out in a binder-removing step before the sintering. According to the type of binder, additives of different types are also stripped from the part.

There are differences between thermal binder-removing systems (melting out or destruction via the gas phase), solvent extraction, and catalytic solvent-stripping methods. Afterward there is the sintering process in which as a result of diffusion the part is densified up to about 98% of the theoretical density. As a result of the considerable binder content, during sintering there is considerable shrinkage (15 to 20% by volume). Controlling the shrinkage is essential in the production of near-net-shape parts.

Typically used materials for the metallic components in metal-powder injection molding are stainless steel, carbon steel, tool steal, or alloy steel, also ferrite, tungsten carbide, and copper/bronze, cobalt/chromium and tungsten/copper mixtures.

B) Method of Making Near-Net-Shape Ceramic Parts.

The known metal powder injection molding (MIM) method has also been applied to the production of ceramic parts. The so-called powder injection molding (PIM) method also can produce ceramic parts as ceramic injection molding (CIM). To get a corresponding injectable powder mass, organic binder is mixed with ceramic powder. The injection molding process and the sintering are carried out as in metal-powder injection molding, taking into account the specific characteristics of ceramic powders (e.g. smaller particle size of the starting powder).

C) Manufacture of Porous Metallic Parts.

The compression of metal powders to produce porous metal bodies is also known from the literature. To achieve the desired porosity the metal powders can be supplemented with so-called place-holding materials that make it possible to achieve the desired porosity. After compressing the green powder-mixture bodies the place-holding material has to be stripped out of the green bodies so that the green bodies hold nothing but the remaining metal-powder lattice forming empty spaces. The green body thus already has the later porous structure of the shaped body. When the place-holding material is driven out, care is taken to ensure that the metal-powder lattice remains. The subsequent sintering of the green bodies produces a highly porous shaped body, the contacting surfaces of the particles being diffused together when sintered.

As place-holding material for forming the porous metallic shaped bodies one uses high-melting-point organic compositions which are vaporized or pyrolized (cracked) with release of the thus produced crack byproducts by means of appropriate solvents from the green bodies. The problem with this is the considerable time it takes to separate the place-holding material and cracking byproducts that react with nearly all the powder-metallurgical metals such as Ti, Al, Fe, Cr, Ni, and the like and that leave behind high concentrations of impurities. This disadvantage is also encountered when thermoplastics are used, because they have to be heated to get them out of the green body so that the expansion at the glass-transition point is bad for the desired stability of the green body.

In addition the place-holding materials can be inorganic high-melting-point materials such as alkali salts and low-melting metals such as Mg, Sn, Pb, and the like. Such place-holding materials are stripped out in a vacuum or in an inert gas at temperatures of about 600 to 1000° C. at considerable cost in terms of energy and time. It is impossible to avoid the harm done by these place-holding materials in particular when used in reactive metal powders such as Ti, Al, Fe, Cr, and Ni.

With alkaline salts there is also the possibility of stripping them out by dissolving them with an appropriate solvent (e.g. water). This method is not ideal for pressed mixtures of metal powders and alkaline salts since the structural integrity of the pressed product is largely lost in the process.

German 196 38 927 describes a method of making highly porous metallic molded bodies wherein first metal powder and a place holder are mixed and then pressed into a green body. Uniaxial and isostatic compression can both be used. The place holder is driven out by heat and the green body is then sintered. If the powder/place-holder mixture is stabilized with a binder, it is usually possible to directly produce a relatively complicated shape in the finished part by multiaxial pressing. The production of a pressing tool to do this is however expensive and difficult. For small series it is thus advantageous to produce intermediate products with a universal shape (e.g. cylinder or plate) and to transform them by a subsequent mechanical step into the desired end shape.

In addition it is necessary to manufacture highly porous parts in large numbers as for use in medicine, air or space travel, or even as filters. Porous parts are made today for example by foaming aluminum or by powder technologies by the use of appropriate place holders. These methods only limitedly allow a near-end shape to be produced of complexly contoured parts in large numbers.

OBJECT OF THE INVENTION

It is an object of the invention to produce a method of producing near-net-shape metallic and/or ceramic parts, wherein highly porous parts are produced that have an open porosity of more than 10% by volume, in particular of more than 50% by volume. This object is achieved by a method with all the features of the main claim. Preferred features of the method are seen in the dependent claims.

SUMMARY OF THE INVENTION

The present invention relates to the production of complex, highly porous, near-net-shape parts with the so-called powder injection molding (PIM) method. The porosities not to date achievable by this method are attained by the use of certain place holders. With the known powder injection molding (PIM), which includes metal injection molding (MIM) and ceramic injection molding (CIM), metallic and also ceramic powders can be employed. Above all with metallic powders there is the necessity of leaving minimal residual impurities at the end of the process.

In the following the individual method steps of the production method according to the invention are described with reference to an example.

Starting Powder

The above-discussed method is ideal for the use of metallic and also ceramic powders. The particle size of the starting powder can lie in the range of up to 300 µm. To form delicate structures and to achieve a high sintering level between the particles, even finer particles (<50 µm) are preferred. The preferred metallic materials are for example stainless steel, carbon steel, tool steel or alloy steel as well as ferrite, tungsten carbide, and copper/bronze, cobalt/chromium, or even tungsten, copper mixtures.

In addition other starting materials have been tried, in particular titanium, $TiAl_6V_4$, nickel-titanium (NiTi) as well as stainless steel (e.g. 316L). These materials have a high affinity for the elements oxygen, carbon, nitrogen, as well as the halogens and thus show what impurities to expect in the sintered parts.

The place holder to use should have the following features:

particle size from 200 to 2000 µm, no toxicity, water-endangerment class 0 to at most 1, good solubility in water (requirement for stripping out the place holder, no breakdown up to at most 800° C., and inexpensive.

It has been discovered according to the invention that in particular NaCl, KCl, $K_2CO_3$, and $Na_2CO_3$ fulfill these requirements and give the desired results. These place holders do their jobs particularly well in combination with the MIN feedstock, since the components of the feedstock alone ensure the stability of the parts. It is necessary to take care that the components of the feedstock are not dissolved by the solvent to be used. In order to ensure characteristics reproducible in subsequent parts, the starting characteristics of the employed starting powder (particle distribution, surface composition, chemical analysis of impurities, shake and knock density) must be established.

Production of the Injectable Mass

The metal powder is plastified and homogenized with the place holder and a binder in a mixer preheated to 110° C. The binder has two components, a plastifier (amide wax) and a component (polyolefin) stabilizing the green starting material.

Shaping Injection

The homogenized and reduced mass for injection, comprised of metal powder, place holder, and binder, is plastified in an injection-molding machine at 100° C. to 120° C. and injected into a mold preheated to between about 30 and 50° C., in particular about 40° C. The pressures and temperatures are set such that there is no separation or nonhomogeneous distribution of the place holder.

Capillary Separation of Binder from Parts

Green Mass

The first binder separation leads to an open porosity in the green mass that facilitates in the next method step access of a solvent to the place-holding particles. According to particle size of the starting powder, the binder separation takes place in one or two steps. If the particle size is in the rage of 20 to 500 µm a one-stage binder separation is sufficient to achieve the necessary porosity. To this end the green mass is set on a capillary-active material ($Al_2O_3$ powder) and subjected to a 700 mbar absolute vacuum drying at 130° C. Then the chamber is heated over 2 h to 185° C. This removes about 50% by weight of the fluent component (amide wax). The capillary-active binder separation is also known as "wicking." If the particle size of the starting powder is less than 20 µm, after the capillary first-stage binder separation there is a thermal first-stage binder separation. To do this the parts, after the capillary-active first binder separation, are put in a heated chamber at 20 mbar with an argon throughflow of 10 l/min at 20° C. and are heated to 270° C. The heating rate is about 5 K/min. Cooling follows immediately afterward.

Removal of the Place Holder

After the first-stage binder separation the green mass has a sufficiently open porosity to extract the place holder in the next step at least partially with the aid of a liquid, preferably water. To this end the partially binder-free stable green body is set in a water bath preheated to 40° C. to 80° C., the bath being continuously replenished and stirred. When no more ions can be detected, the place holder is almost completely gone. This process takes for example for a titanium part having a porosity of 70% by volume and an overall volume of 10 $cm^3$ about 3.5 hours.

It is also possible to use any fluid in which the place holder is soluble and that itself does not react chemically with the material of the green body.

Final Binder Removal of the Place-Holder-Free Parts

The removal of the residual binder (generally the stabilizing polyolefin component) is also done thermally. To this end the parts are for example heated in an autoclave at a pressure of 20 mbar with a throughflow of 10 l/min of argon and a heating rate of 4 k/min from room temperature to 480° C., and then immediately cooled and sintered.

Sintering of the Place-Holder and Binder-Free Sample

According to the material, the parts are subjected to the appropriate sintering process and sintered at temperatures from 800 to 2400° C. in the appropriate atmosphere (vacuum, argon, argon/hydrogen, etc). The heating rate and treatment time depend on the workpiece.

The new method according to the invention of powder injection molding is ideal for producing highly porous near-net-shape workpieces from metallic and ceramic starting powders. Complex shapes can be made in large quantities. The place holder used (NaCl, KCl, $K_2CO_3$, and $Na_2CO_3$) is not toxic. It can be removed quickly, virtually without residue, and at very low cost (in a water bath) from the parts. Since the stability of the parts is guaranteed by the binder, the parts have their near net shape when the place holder is removed. The place holder is inexpensive and can, if necessary, be recovered from its solvent.

With the place holder pore sizes in the range of 20 μm to 2 mm and porosities from 10 to 85% by volume, in particular more than 30% by volume or more than 50% by volume can be achieved. The pore distribution is very homogeneous since the feedstock mixes well due to its viscosity. The length of the entire process is mainly determined by the binder removal and the removal of the place holder. Starting with the capillary-active first-stage binder removal and even with the additional expense of a thermal first-stage binder removal (for metal and ceramic powders <20 μm) the overall time is not more than 14 to 20 hours. This includes the removal of the place holder, the stripping out of residual binder, and the sintering including the heating, cooling, and waiting phases. In addition this is a cost-effective and inexpensive method when medium to large production runs are planned.

SPECIFIC EXAMPLE

In the following the object of the invention is more closely described with reference to an embodiment but without limiting the scope of the invention.

By way of example the method produces a concrete highly porous part (cylinder with a diameter of 25 mm and height of 30 mm when green) from stainless 316L steel (material number 1.4404) with a porosity of at least 70% by volume and pore sizes in the range of 200 to 400 μm. Because of the size of the mixer being used, a charge of 300 $cm^3$ is produced. The starting materials are:

stainless steel 316L powder (1.4404) with a density of 7.9 g/$cm^3$ and a particle size <15 μm;
binder 60% by weight of amide-wax, trade name C wax having a density of 1.0 g/$cm^3$ and 40% by weight polyolefin, trade name PE 520 with a density of 0.93 g/$cm^3$;
place holder of NaCl with density of 2.14 g/$cm^3$ and a mesh particle size of 200 to 400 μm.

For addition of 70% by volume of place holder and an overall volume of 300 $cm^3$ the following are used:
470.4 g metal stainless steel 316L powder;
297.3 g NaCl place holder;
59.1 g C wax;
39.4 PE 520.

In order to make the injectable mass the binder is first melted at 185° C. and is then mixed with the metal powder. After plastifying the metal powder and the binder, the place holder is added and mixed in for 2 h. The mass is taken out, reduced, and fed to the injection molder. To work and shape the injectable mass the following parameters and machine setting are used. Since the settings depend from the shape of the part as well as the binder and place-holder content, no absolute values can be given, only ranges:

mold temperature: 44° C. to 49° C.;
  cylinder zones
    Zone 1 (at the nozzle) 144 to 148° C.,
    Zone 2 135° C.,
    Zone 3 (input of the mass) 144 to 148° C.
injection pressure 150 to at most 500 bar;
injection time 3 to 6 sec;
injection flow 10 to 50 $cm^3$/sec.

Afterward the parts (green) are set on a capillary-active material ($Al_2O_3$ agglomerate of size 600 to 800 μm). The samples are now set in a vacuum chamber preheated to 130° C. The samples are subject to a vacuum of 700 mbar absolute and preheated in a half hour to 130° C. Afterward they are heated at about 1 K/min to 185° C., held for one hour, and then cooled. The samples can be taken out of the vacuum chamber at a temperature of 120° C. Since the particle size of the 316L powder <15 μm, the samples must be thermally stripped of binder. To this end the samples are heated in a chamber at 20 mbar with an argon throughput at 5 l/min with a heating rate of 4 K/min to 260° C. and are then cooled. Subsequently the NaCl place holder is removed in a continuously (magnetically) stirred water bath at 50° C. Gravimetrically the complete removal of the place holder takes 3 h. The samples, which at this stage only contain metal powder, PE 520 wax, and a very small amount of C wax, are heated in a chamber at 20 mbar with an argon throughput of 5 l/min with a heating rate of 5 K/min to 480° C. and are then immediately cooled. Gravimetrically the complete removal of all the place holder and binder can be verified. The samples are sitting on an $Al_2O_3$ base in which the sintering can take place. The sintering is done at 1000° C. for 2 h in a vacuum. After the sintering, there is a porosity of 78% by volume. As a result of the reducing during sintering a loss of oxygen and nitrogen can be demonstrated. The expected increase in carbon content is within acceptable limits.

The drawing shows a microstructure of a highly porous metallic part of 316L that was sintered at 1000° C. for 2 h. The pore characteristics are remarkable as they reproduce the cubic crystalline structure of the NaCl particles used as place holder.

The invention claimed is:

1. A method of making porous near-net-shape metallic parts with an open porosity of at least 10% by volume, the method comprising the steps of:
  a) forming an injectable mass of a metallic powder of stainless steel, Ti, NiTi, or a titanium alloy, at least one thermoplastic binder, and at least one place holder;
  b) injection molding the mass into the shape of the part to be produced;
  c) cooling the injection-molded mass and setting it in a capillary-active material and subjecting it to a first-stage binder removal to produce an open porosity;
  d) removing the place holder at least partially from the part with a fluid;
  e) subjecting the part to a thermal binder-removing process;
  f) subsequently sintering the part.

2. The method according to claim 1 wherein the place holder is NaCl, KCl, $K_2CO_3$, or $Na_2CO_3$.

3. The method according to claim wherein between steps c) and d) there is a thermal binder-removing step.

4. The method according to claim 3 wherein the thermal binder-removing step is conducted at a temperature up to 270° C. under a protective-gas atmosphere.

5. The method according to claim 4 wherein the starting powder has a particle size of less than 20 μm.

6. The method according to claim 3 wherein the thermal binder-removing step is conducted at a temperature up to 500° C. and under a protective-gas atmosphere.

7. The method according to claim 2 wherein the fluid is at about 50° C.

8. The method according to claim 1 wherein the fluid for removing the place holder is water.

9. The method according to claim 1 wherein a stirred water bath is used in order to remove the place holder.

10. The method according to claim 1 wherein the thermal binder-removing step uses argon as a protective gas.

11. The method according to claim 1 wherein an open porosity in the part is produced of at least 30% by volume.

12. The method according to claim 1 wherein an open porosity in the part is produced of about 50% by volume.

* * * * *